(12) United States Patent
Wolfe et al.

(10) Patent No.: US 10,351,708 B2
(45) Date of Patent: Jul. 16, 2019

(54) CATIONIC MODIFIED SELF-DISPERSING PIGMENT DISPERSIONS

(71) Applicant: E I DU PONT DE NEMOURS AND COMPANY, Wilmington, DE (US)

(72) Inventors: Michael Stephen Wolfe, Wilmington, DE (US); Charles T. Berge, Earleville, MD (US); Loretta L. Tam, Hockessin, DE (US); Cullen Kirkpatrick, Phoenixville, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/570,409

(22) PCT Filed: Apr. 27, 2016

(86) PCT No.: PCT/US2016/029433
§ 371 (c)(1),
(2) Date: Oct. 30, 2017

(87) PCT Pub. No.: WO2016/176246
PCT Pub. Date: Nov. 3, 2016

(65) Prior Publication Data
US 2018/0134896 A1 May 17, 2018

Related U.S. Application Data

(60) Provisional application No. 62/154,899, filed on Apr. 30, 2015.

(51) Int. Cl.
| | |
|---|---|
| *C09B 67/00* | (2006.01) |
| *C09D 11/326* | (2014.01) |
| *C09B 67/46* | (2006.01) |
| *C09D 11/10* | (2014.01) |
| *C09D 11/322* | (2014.01) |
| *C09D 11/324* | (2014.01) |
| *C09D 17/00* | (2006.01) |
| *C09C 1/56* | (2006.01) |
| *C08L 33/08* | (2006.01) |
| *C08L 67/00* | (2006.01) |
| *C08L 75/04* | (2006.01) |
| *C09D 11/38* | (2014.01) |

(52) U.S. Cl.
CPC .......... *C09B 67/0088* (2013.01); *C08L 33/08* (2013.01); *C08L 67/00* (2013.01); *C08L 75/04* (2013.01); *C09B 67/009* (2013.01); *C09C 1/565* (2013.01); *C09D 11/10* (2013.01); *C09D 11/322* (2013.01); *C09D 11/324* (2013.01); *C09D 11/326* (2013.01); *C09D 11/38* (2013.01); *C09D 17/001* (2013.01); *C09D 17/003* (2013.01); *C09D 17/005* (2013.01); *C01P 2004/61* (2013.01); *C01P 2004/62* (2013.01); *C01P 2004/64* (2013.01)

(58) Field of Classification Search
CPC .............................. C09D 11/30; C09D 11/322
See application file for complete search history.

(56) References Cited

U.S. PATENT DOCUMENTS

| | | |
|---|---|---|
| 5,554,739 A | 9/1996 | Belmont |
| 6,099,632 A | 8/2000 | Nagasawa et al. |
| 6,153,001 A | 11/2000 | Suzuki et al. |
| 6,277,183 B1 | 8/2001 | Johnson et al. |
| 6,332,919 B2 | 12/2001 | Osumi et al. |
| 6,375,317 B1 | 4/2002 | Osumi et al. |
| 6,852,156 B2 | 2/2005 | Yeh et al. |
| 6,899,754 B2 | 5/2005 | Yeh et al. |
| 7,375,147 B2 * | 5/2008 | Suzuki .................. C09D 11/40 106/31.27 |
| 2002/0075369 A1 | 6/2002 | Ota et al. |
| 2004/0035319 A1 * | 2/2004 | Yeh ...................... C09D 11/322 106/31.6 |
| 2009/0020035 A1 * | 1/2009 | Jackson ............... C09D 11/322 106/31.9 |

FOREIGN PATENT DOCUMENTS

| | | |
|---|---|---|
| EP | 1086997 A2 | 3/2001 |
| WO | 2003/104340 A1 | 12/2003 |
| WO | 2009/079070 A1 | 6/2009 |
| WO | 2010/111336 A1 | 9/2010 |

OTHER PUBLICATIONS

PCT International Search Report for Application No. PCT/US2016/029433; Haider, Ursula, Authorized Officer; ISA/EPO; dated Aug. 25, 2016.

* cited by examiner

*Primary Examiner* — Veronica F Faison
(74) *Attorney, Agent, or Firm* — Simon L. Xu

(57) ABSTRACT

This invention pertains to self-dispersing pigment dispersions. The self-dispersing pigments are modified with a multivalent cation and an anionic polymer.

12 Claims, No Drawings

CATIONIC MODIFIED SELF-DISPERSING PIGMENT DISPERSIONS

This application claims priority under 35 U.S.C. § 119 from U.S. Provisional Application Ser. No. 62/154,899, filed Apr. 30, 2015.

BACKGROUND OF THE INVENTION

This invention pertains to self-dispersing pigment dispersions which are modified with a multivalent cation and an anionic polymer.

Inkjet printing is a non-impact printing process in which droplets of ink are deposited on a substrate, such as paper, to form the desired image. Inkjet printers are equipped with an ink set which, for full color printing, typically comprises a cyan, magenta and yellow ink (CMY). An ink set also commonly comprises a black ink (CMYK).

Pigments suitable for aqueous inkjet inks are in general well-known in the art. Typically, pigments are stabilized by dispersing agents, such as polymeric dispersants or surfactants, to produce a stable dispersion of the pigment in the vehicle. The pigment can also be "self-dispersible" or a "self-dispersing" pigments (hereafter "SDP(s)").

U.S. Pat. No. 6,899,754 discloses an inkjet ink containing an SDP and a multivalent cation. The multivalent cation is added at the ink formulation stage rather than during the preparation of the SDP dispersion.

U.S. Pat. No. 6,332,919 and EP-A-1086997 disclose a black inkjet ink comprising an SDP and salts of monovalent cations. It is suggested that the presence of these monovalent salts improves optical density at a given pigment loading.

U.S. Pat. No. 6,277,183 discloses a black inkjet ink comprising an SDP ink and a metal oxide, where optical density of the ink is higher when metal oxide is present than when it is absent.

U.S. Pat. No. 6,153,001 discloses an example of a black inkjet ink containing an SDP (Microjet® CW1) and 9 ppm calcium. No information is provided on the source or physical state of the calcium or on the nature of the SDP. No suggestion is made of any optical density relationship.

U.S. Pat. No. 6,375,317 discloses an inkjet ink comprising an SDP and calcium hydroxide in an aqueous medium.

A need still exists for stable self-dispersing pigment dispersions that can be readily formulated into an ink. The present disclosure satisfies this need by providing a process for preparing stable self-dispersing pigment dispersions.

SUMMARY OF THE INVENTION

An embodiment provides an aqueous pigment dispersion comprising:

a self-dispersing pigment having at least one type of hydrophilic functional group bonded onto a surface of the self-dispersing pigment, said at least one type of hydrophilic functional group comprising a carboxyl group;

a multivalent cation selected from the group consisting of $Mg^{2+}$, $Ca^{2+}$, $Cu^{2+}$, $Al^{3+}$, $Fe^{3+}$, and mixtures thereof, wherein said cation is adsorbed onto said self-dispersing pigment via ionic bonds between the cation and surface acid group on the self-dispersing pigment; and an anionic polymeric binder.

Another embodiment provides that the multivalent cation is present at a level of at least 2 ppm.

Another embodiment provides that the multivalent cation is $Mg^{2+}$.

Another embodiment provides that the multivalent cation is $Cu^{2+}$.

Another embodiment provides that the multivalent cation is $Ca^{2+}$.

Another embodiment provides that the multivalent cation is $Al^{3+}$.

Another embodiment provides that the anionic polymeric binder is selected from the group consisting of polyurethane, waterborne acrylic copolymer, waterborne polyester, and mixtures thereof.

Another embodiment provides that the polyurethane is amphoteric.

Another embodiment provides that the polyurethane is an amphoteric polyester.

Another embodiment provides that the acrylic copolymer is a random polymer.

Another embodiment provides that the acrylic is a block polymer.

Yet another embodiment provides that the waterborne acrylic copolymer is a graft polymer.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "SDP" means a "self-dispersible" or "self-dispersing" pigment.

As used herein, the term "dispersion" means a two phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments, the dispersants are most often polymeric dispersants, and the dispersants and pigments are usually combined using a dispersing equipment.

As used herein, the term "OD" means optical density.

As used herein, the term "degree of functionalization" refers to the amount of hydrophilic groups present on the surface of the SDP per unit surface area, measured in accordance with the method described further herein.

As used herein, the term "aqueous vehicle" refers to water or a mixture of water and at least one water-soluble, or partially water-soluble (i.e., methyl ethyl ketone), organic solvent (co-solvent).

As used herein, the term "D50" means the volume particle diameter of the 50th percentile (median) of the distribution of particle sizes.

As used herein, the term "substantially" means being of considerable degree, almost all.

As used herein, the term "dyne/cm" means dyne per centimeter, a surface tension unit.

As used herein, the term "cP" means centipoise, a viscosity unit.

As used herein, the term "mPa·s" means millipascal second, a viscosity unit.

As used herein, the term "mN·m$^{-1}$" means milliNewtons per meter, a surface tension unit.

As used herein, the term "mS·cm$^{-1}$" means milliSiemens per centimeter, a conductivity unit.

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "DHEG" means dihydroxyethylglycine.

As used herein, the term "DTPA" means diethylenetriamine-N,N,N',N'',N''-pentaacetic acid.

As used herein, the term "GEDTA" means glycoletherdiamine-N,N,N',N'-tetraacetic acid.

As used herein, the term "RMSD" refers to root mean square deviation.

As used herein, the term "jettability" means good jetting properties with no clogging or deflection during printing.

As used herein, the term "persistence length" is a basic mechanical property quantifying the stiffness of a long polymer.

Unless otherwise noted, the above chemicals were obtained from Aldrich (Milwaukee, Wis., U.S.A.) or other similar suppliers of laboratory chemicals.

The materials, methods, and examples herein are illustrative only except as explicitly stated, and are not intended to be limiting.

In addition, references in the singular may also include the plural (for example, "a" and "an" may refer to one, or one or more) unless the context specifically states otherwise.

Pigments

The SDPs of the present disclosure may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. Nos. 5,554,739 and 6,852,156.

The SDPs may be black, such as those based on carbon black, or may be colored pigments. Examples of pigments with coloristic properties useful in inkjet inks include: Pigment Blue 15:3 and Pigment Blue 15:4 (for cyan); Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP. Colorants are referred to herein by their "C.I.".

The SDPs of the present disclosure may have a degree of functionalization wherein the density of anionic groups is less than about 3.5 μmoles per square meter of pigment surface (3.5 μmol/m$^2$), and more specifically, less than about 3.0 μmol/m$^2$. Degrees of functionalization of less than about 1.8 μmol/m$^2$, and more specifically, less than about 1.5 μmol/m$^2$, are also suitable and may be preferred for certain specific types of SDPs.

The range of useful particle size after dispersion is typically from about 0.005 micrometers to about 15 micrometers. Typically, the pigment particle size should range from about 0.005 micrometers to about 5 micrometers; and, specifically, from about 0.005 micrometers to about 1 micrometers. The average particle size as measured by dynamic light scattering is less than about 500 nm, typically less than about 300 nm.

Multivalent Cation

The self-dispersing pigment dispersion of the present disclosure comprises one or more multivalent cations. The effective amounts needed in a particular situation can vary, and some adjustment, as provided for herein, will generally be necessary.

"Multivalent" indicates an oxidation state of two or more and, for an element "Z", are typically described as $Z^{2+}$, $Z^{3+}$, $Z^{4+}$ and so forth. For brevity, multivalent cations may be referred to herein as $Z^x$. The multivalent cations are preferably soluble in the aqueous ink vehicle and preferably exist in a substantially ionized state. The multivalent cations should be in a form where they are free and available to interact with ink components, in particular the SDP. A multivalent cation in unavailable form, for example $Z^x$ tightly bound as a refractory oxide, is not considered a multivalent cation for the purposes of this invention.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. In one embodiment, the multivalent cation is not Ca. In another embodiment, the multivalent cation comprises at least one of Ca, Ba, Ru, Co, Zn and Ga. In yet another embodiment, the multivalent cation comprises at least one of Ba, Ru, Co, Zn and Ga. In a preferred embodiment, $Z^x$ comprises a trivalent cation. $Z^x$ can be incorporated into ink by addition in a salt form or by addition in an alkaline form and used as a base in the adjustment of the ink pH. As with any dispersion, especially one that is ionically stabilized, the presence of large amounts of $Z^x$ can be destabilizing. The effective levels of $Z^x$ needed for the instant inks are below that which causes instability or other problems.

There is no particular lower limit of $Z^x$, although minimum levels contemplated by the instant invention are levels greater than trace or incidental amounts. Generally, there is at least about 2 ppm, commonly at least about 4 ppm, and even 10 ppm or more of multivalent in the ink. Likewise, there is no particular upper limit except as dictated by stability or other ink properties. At some level, though, there is no additional OD gain with increasing $Z^x$. In some cases, too much $Z^x$ may cause the OD to decrease again. In general, beneficial effects are achieved with less than about 200 ppm of $Z^x$, and typically even less than about 100 ppm.

Although the preceding discussion of $Z^x$ in terms of weight percent is provided for the sake of simple, concrete guidance, it will be appreciated from the examples herein after that the appropriate levels of multivalent cations are related in a more complex way to factors such as molar equivalents, atomic weight, valence state; and also, to the amount SDP in the ink and its level of treatment.

Thus a preferred method for considering multivalent cation content is by adjusted equivalents of $Z^x$ per 100 equivalents of surface function. The amount of Z present is adjusted (multiplied by) the valence state (x). An equation can be written as follows:

$$\text{Adjusted } Z \text{ per } 100 \text{ surface function} = \frac{100 \text{ (equivalents } Z) (x)}{\text{equiv. of surface function}}$$

When $Z^x$ comprises more than one species of multivalent cation, the adjusted Z per 100 surface function is the sum of adjusted Z for all $Z^x$ species present. Preferred levels of adjusted Z per 100 surface function range between about 0.5 to 20, and more preferably between about 0.8 to 12.

Due to potential problems with kogation in thermo inkjet printheads associated with soluble multivalent cations, selection of cation is critical. A suitable cation is one that can strongly adsorb onto SDP pigment acid functionality. $Al^{3+}$, $Fe^{3+}$, $Mg^{2+}$, $Cu^{2+}$ and $Ca^{2+}$ are particularly suitable for the dispersions of the present disclosure, although other multivalent cations may also be used.

Addition of multivalent cations to SDP by methods described in U.S. Pat. No. 6,899,754 limits the level of cations that can be added because the ionic strength will become too high. A high level of multivalent cations can be introduced to the dispersion by removing ionic strength from monovalent cations and anions.

Water soluble multivalent cation salts are added directly to a pigment dispersion. Adjustment of pH during the addition of cation salts may be necessary to maintain alkalinity. The addition of cation salts is typically followed by ultrafiltration in order to lower the ionic strength so as to improve dispersion stability. Otherwise, the resulting dispersion may exhibit particle size growth due to dispersion shocking during the addition of salts. Microfluidization or other high shear processing may be required to break up the aggregates. Alternatively, by maintaining a conductivity target of the concentrate during ultrafiltration, it is possible to achieve a specific multivalent cation mole ratio with respect to surface acid functionality while controlling particle size growth.

The dispersions of the present disclosure can also be made by introducing the multivalent cations as water soluble salts or water insoluble hydroxides during the SDP oxidation process, such as the ones described in U.S. Pat. No. 6,852,156, which is incorporated by reference herein as if fully set forth. The hydroxides thus introduced can be solubilized due to acids generated during the oxidation process.

Anionic Polymeric Binder

Suitable anionic polymeric binders for the present disclosure include polyurethane, polyurea, polyester, polyether, waterborne acrylic copolymers, and mixtures thereof. The polyurethane and polyester can be amphoteric. The acrylic copolymer include random, graft and block polymers.

EXAMPLES

Calculation of Acid Value

The acid value was calculated as shown below.

$$\text{Acid Value} = (V_2 - V_1) * (\text{HCl Normality}) / (\text{Sample Wt.} *\% \text{ Solids of sample})$$

Units for Acid Value is "mmols of acid per g solid"
Where:
$V_1$=Volume (mL) at Inflection Pt. #1
$V_2$=Volume (mL) at Inflection Pt. #2
HCl Normality=Normality of the HCl titrant solution used in titration
Sample Wt.=Weight (g) of the aqueous SDP
% Solids=Percent solids of acid-containing pigment dispersion Polymeric Binder 1

Polymeric Binder 1 contains carboxylic acid groups with an AV of 0.55 mmols acid/g, and was prepared according to the procedures disclosed patent publication WO2013/165946, which is incorporated by reference herewith, as if fully set forth.

Pigment Dispersion 1

Carbon Black (Nipex 160 IQ, Orion, surface area=180, Oil Absorption=128, primary particle size=20 nm) was oxidized according to the procedure described in U.S. Pat. No. 6,852,156, which is incorporated by reference herein as if fully set forth, until the desired level of surface functionalization was achieved, and subsequently neutralized with potassium hydroxide.

After oxidation and neutralization, the dispersion was purified by ultrafiltration. The acid value of the dispersion was measured by adjusting the pH of a weighed sample of the dispersion to ~12 to ensure all acid groups on the surface are neutralized.

The sample was then back titrated with dilute hydrochloric acid using an auto titrator. Pigment Dispersion 1 thus obtained had a solid content of 19.45% and an acid value of 0.41 mmol/g.

After the dispersion was made, Polymeric Binder 1 was free added to the dispersion at a pigment to binder P/B ratio of 10 and stirred for 30 minutes.

Pigment Dispersion 2

A sample of Pigment Dispersion 1 was added to a pot and diluted with DI water until the pigment concentration is 4%. The bottom discharge of the pot was pumped to a 500 kilodalton ultrafiltration membrane cartridge and recirculated. Separately, a 0.04 M solution of iron nitrate was prepared and loaded into an addition funnel. The amount of solution prepared was such that the molar ratio of $Fe(NO_3)_3$ to pigment surface acid was 0.4. The addition funnel was mounted above the concentrate pot and added dropwise, while permeate was collected in a separate pot. The iron displaces the potassium salt on the pigment. The potassium and nitrate are removed from the concentrate in the permeate. The concentrate pot was held at ~4% pigment and washed with DI water to a conductivity end point of ~0.1 mS/cm following addition of the salt solution. The dispersion was then concentrated to ~12% pigment.

After the dispersion was made, Polymeric Binder 1 was free added to the dispersion at a pigment to binder P/B ratio of 10 and stirred for 30 minutes.

Pigment Dispersion 3

A sample of Pigment Dispersion 1 was added to a pot and diluted with DI water until the pigment concentration is 4%. The bottom discharge of the pot was pumped to a 500 kilodalton ultrafiltration membrane cartridge and recirculated. Separately, a 0.04 M solution of aluminum nitrate was prepared and loaded into an addition funnel. The amount of solution prepared was such that the molar ratio of $Al(NO_3)_3$ to pigment surface acid was 0.4. The addition funnel was mounted above the concentrate pot and added dropwise, while permeate was collected in a separate pot. The aluminum displaces the potassium salt on the pigment. The potassium and nitrate are removed from the concentrate in the permeate. The concentrate pot was held at ~4% pigment and washed with DI water to a conductivity end point of ~0.1 mS/cm following addition of the salt solution. The dispersion was then concentrated to ~12% pigment.

After the dispersion was made, Polymeric Binder 1 was free added to the dispersion at a pigment to binder P/B ratio of 10 and stirred for 30 minutes.

Pigment Dispersion 4

A sample of Pigment Dispersion 1 was added to a pot and diluted with DI water until the pigment concentration is 4%. The bottom discharge of the pot was pumped to a 500 kilodalton ultrafiltration membrane cartridge and recirculated. Separately, a 0.04 M solution of magnesium nitrate was prepared and loaded into an addition funnel. The amount of solution prepared was such that the molar ratio of $Mg(NO_3)_2$ to pigment surface acid was 0.4. The addition funnel was mounted above the concentrate pot and added dropwise, while permeate was collected in a separate pot. The magnesium displaces the potassium salt on the pigment. The potassium and nitrate are removed from the concentrate in the permeate. The concentrate pot was held at ~4% pigment and washed with DI water to a conductivity end point of ~0.1 mS/cm following addition of the salt solution. The dispersion was then concentrated to ~12% pigment.

After the dispersion was made, Polymeric Binder 1 was free added to the dispersion at a pigment to binder P/B ratio of 10 and stirred for 30 minutes.

Pigment Dispersion 5

Pigment Dispersion 5 was prepared similarly to Pigment Dispersion 2. However, after addition of the multivalent cation solution, Polymeric Binder 1 was added to the concentrate pot during the process, at a pigment to binder P/B ratio of 10. The dispersion was washed with DI water for three volume dilutions and concentrated to ~12% pigment.

Pigment Dispersion 6

Pigment Dispersion 6 was prepared similarly to Pigment Dispersion 3. However, after addition of the multivalent cation solution, Polymeric Binder 1 was added to the concentrate pot during the process at a pigment to binder P/B ratio of 10. The dispersion was washed with DI water for three volume dilutions and concentrated to ~12% pigment.

Pigment Dispersion 7

Pigment Dispersion 7 was prepared similarly to Pigment Dispersion 4. However, after addition of the multivalent cation solution, Polymeric Binder 1 was added to the concentrate pot during the process at a pigment to binder PB ratio of 10. The dispersion was washed with DI water for three volume dilutions and concentrated to ~12% pigment.

Results

The amount of binder adsorbed to the surface of the pigment was quantified by the following method.

A sample of each of the dispersion was diluted to 5% pigment and centrifuged at 20,000 rpm for 2 hours. Next, the supernatant of the centrifuged sample was collected. Three samples of the supernatant were weighed out into trays and placed in an oven at 150° C. for three hours. The average % solids of the three samples was then recorded. The remaining supernatant sample was measured for pigment solids via UV-vis. With this information, a mass balance was prepared to calculate the bound polymer, defined as the amount of polymer adsorbed to the surface and free polymer, defined as the amount of polymer free in solution. The results are shown in Table 1.

TABLE 1

| Pigment Dispersion No. | TREATMENT | P/B | % Bound Polymer | Description |
|---|---|---|---|---|
| 1 | Control | 10 | 22.60% | SDP with Binder Free Add. |
| 2 | $Fe(NO_3)_3$ | 10 | 36.90% | $Fe^{+3}$ Treated SDP with Binder Free Add. |
| 3 | $Al(NO_3)_3$ | 10 | 40.80% | $Al^{+3}$ Treated SDP with Binder Free Add. |
| 4 | $Mg(NO_3)_2$ | 10 | 30.90% | $Mg^{+2}$ Treated SDP with Binder Free Add. |
| 5 | $Fe(NO_3)_3$ | 10 | 68.50% | $Fe^{+3}$ Treated SDP with Binder Add During Ultrafiltration. |
| 6 | $Al(NO_3)_3$ | 10 | 62.50% | $Al^{+3}$ Treated SDP with Binder Add During Ultrafiltration. |
| 7 | $Mg(NO_3)_2$ | 10 | 49.40% | $Mg^{+2}$ Treated SDP with Binder Add During Ultrafiltration. |

As presented in Table 1, % bound polymer increased when the SDP was surface treated with a multivalent cation. Bound polymer was even higher when the binder was added during processing. Also, the SDP samples treated with trivalent cations had more bound polymer than the divalent sample.

What is claimed is:

1. An aqueous pigment dispersion comprising:
   a self-dispersing pigment having at least one type of hydrophilic functional group bonded onto a surface of the self-dispersing pigment, said at least one type of hydrophilic functional group comprising a carboxyl group;
   a multivalent cation selected from the group consisting of $Mg^{2+}$, $Ca^{2+}$, $Cu^{2+}$, $Al^{3+}$, $Fe^{3+}$, and mixtures thereof, wherein said multivalent cation is adsorbed onto said self-dispersing pigment via ionic bonds between the multivalent cation and surface acid group on the self-dispersing pigment displacing monovalent cation(s) associating with the carboxyl group on the surface of the self-dispersing pigment, the displaced monovalent cation(s) are removed from the pigment dispersion; and
   an anionic polymeric binder.

2. The pigment dispersion of claim 1, wherein said multivalent cation is present at a level of at least 2 ppm.

3. The pigment dispersion of claim 1, wherein said multivalent cation is $Mg^{2+}$.

4. The pigment dispersion of claim 1, wherein said multivalent cation is $Cu^{2+}$.

5. The pigment dispersion of claim 1, wherein said multivalent cation is $Ca^{2+}$.

6. The pigment dispersion of claim 1, wherein said multivalent cation is $Al^{3+}$.

7. The pigment dispersion of claim 1, wherein said anionic polymeric binder is selected from the group consisting of polyurethane, waterborne acrylic copolymer, waterborne polyester, and mixtures thereof.

8. The pigment dispersion of claim 7, wherein said polyurethane is amphoteric.

9. The pigment dispersion of claim 7, wherein said polyurethane is an amphoteric polyester.

10. The pigment dispersion of claim 7, wherein said waterborne acrylic copolymer is a random polymer.

11. The pigment dispersion of claim 7, wherein said waterborne acrylic copolymer is a block polymer.

12. The pigment dispersion of claim 7, wherein said waterborne acrylic copolymer is a graft polymer.

* * * * *